(12) United States Patent
Wang et al.

(10) Patent No.: US 10,273,412 B2
(45) Date of Patent: Apr. 30, 2019

(54) METHOD AND DEVICE FOR CARBONIZATION OF CROP STRAWS

(71) Applicant: Shanxi Supply and Marketing Cooperative, Taiyuan, Shanxi Province (CN)

(72) Inventors: Xiaoguang Wang, Taiyuan (CN); Jingyong Jing, Taiyuan (CN); Shuqin Zhang, Taiyuan (CN)

(73) Assignee: SHANXI SUPPLY AND MARKETING COOPERATIVE, Taiyuan (CN)

( * ) Notice: Subject to any disclaimer, the term of this patent is extended or adjusted under 35 U.S.C. 154(b) by 381 days.

(21) Appl. No.: 15/136,514

(22) Filed: Apr. 22, 2016

(65) Prior Publication Data

US 2016/0326437 A1    Nov. 10, 2016

Related U.S. Application Data

(62) Division of application No. 13/579,147, filed as application No. PCT/CN2011/000265 on Feb. 21, 2011, now Pat. No. 9,321,966.

(30) Foreign Application Priority Data

Feb. 23, 2010    (CN) .......................... 2010 1 0114478

(51) Int. Cl.
     *C10B 53/02*      (2006.01)
     *C10B 1/04*      (2006.01)
     (Continued)

(52) U.S. Cl.
     CPC .............. *C10B 53/02* (2013.01); *C01B 32/05* (2017.08); *C05D 9/00* (2013.01); *C10B 49/02* (2013.01);
     (Continued)

(58) Field of Classification Search
     CPC ......... C10B 49/00; C10B 49/02; C10B 49/10; C10B 49/20; C10B 53/02; C10B 1/00;
     (Continued)

(56) References Cited

U.S. PATENT DOCUMENTS

| | | |
|---|---|---|
| 1,190,006 A | 7/1916 | Ratliff |
| 1,395,866 A | 11/1921 | Pearce |
| | (Continued) | |

FOREIGN PATENT DOCUMENTS

| | | |
|---|---|---|
| CN | 1326423 A | 12/2001 |
| CN | 101195757 A | 6/2008 |
| | (Continued) | |

OTHER PUBLICATIONS

"About Butterfly Valves", GlobalSpec.com, Dec. 15, 2005 (date obtained from WaybackMachine).*

(Continued)

*Primary Examiner* — Jonathan Miller
*Assistant Examiner* — Jonathan Luke Pilcher
(74) *Attorney, Agent, or Firm* — Christensen O'Connor Johnson Kindness PLLC

(57) ABSTRACT

The present invention is to provide a method for carbonization of crop straws and a device thereof. Pyrolysis process is controlled by regulating the feeding of oxygen during said pyrolysis process, and pyrolysis and carbonization are respectively conducted in separate pyrolysis and carbonization pools, wherein the straws are pyrolyzed in said pyrolysis pool and entered into said carbonization pool to be carbonized. The present invention can quickly raise the temperature of the pyrolysis process, shorten the time of the pyrolysis process, and improve the pyrolysis carbonization efficiency.

13 Claims, 3 Drawing Sheets

(51) Int. Cl.
  *C10G 1/02* (2006.01)
  *C10L 5/44* (2006.01)
  *C10B 49/02* (2006.01)
  *C10B 57/02* (2006.01)
  *C05D 9/00* (2006.01)
  *C01B 32/05* (2017.01)

(52) U.S. Cl.
  CPC ............... *C10B 57/02* (2013.01); *C10G 1/02* (2013.01); *C10L 5/447* (2013.01); *C10B 1/04* (2013.01); *C10L 2200/0469* (2013.01); *C10L 2290/02* (2013.01); *Y02E 50/10* (2013.01); *Y02E 50/14* (2013.01); *Y02E 50/30* (2013.01)

(58) Field of Classification Search
  CPC .... C10B 1/02; C10B 1/04; C10B 1/06; C10B 1/08; C10B 3/00; C10B 47/02; C10B 47/06; C10B 47/10; C10B 47/28; C10B 51/00; C10B 21/20; C10B 33/12; C10B 57/02; C10B 39/14; C10J 2300/0956; C10J 3/02; C10J 3/04; C10G 1/02; C10L 5/447; Y02E 50/14
  See application file for complete search history.

(56) References Cited

U.S. PATENT DOCUMENTS

| 2,885,338 | A | 5/1959 | Evans |
| 3,875,317 | A | 4/1975 | Ferguson |
| 6,669,822 | B1 | 12/2003 | Fujimura |
| 7,354,557 | B2 | 4/2008 | Muramatsu et al. |
| 8,986,507 | B2 | 3/2015 | Schottdorf |
| 2012/0079762 | A1 | 4/2012 | Schottdorf |

FOREIGN PATENT DOCUMENTS

| CN | 101565637 A | 10/2009 |
| EP | 1 312 662 A2 | 5/2003 |

OTHER PUBLICATIONS

English language abstract of Xaio, CN 101565637 A, Oct. 28, 2009, obtained from Espacenet.
International Preliminary Report on Patentability and Written Opinion dated Jun. 2, 2011, issued in corresponding International Application No. PCT/CN2011/000265, filed Feb. 2, 2011, 9 pages.
International Search Report dated Jun. 2, 2011, issued in corresponding International Application No. PCT/CN2011/000265, filed Feb. 2, 2011, 5 pages.

* cited by examiner

METHOD AND DEVICE FOR CARBONIZATION OF CROP STRAWS

CROSS-REFERENCES TO RELATED APPLICATIONS

This application is a division of U.S. patent application Ser. No. 13/579,147, filed on Aug. 15, 2012, which is the National Stage of International Application No. PCT/CN2011/000265, filed on Feb. 21, 2011, both of which applications are incorporated herein by reference in their entirety.

FIELD OF INVENTION

This invention relates to a field of pyrolysis carbonization technology for straws, and in particular, a method and a device for carbonization of crop straws.

BACKGROUND

Carbonization of crop straws plays an important role in the general utilization of straws. Methods and Devices for carbonization of crop straws become much well developed during the technology development, but some drawbacks still exist.

For example, as described in the Chinese Patent No. ZL200510044136.3, entitled "Carbonization Process for Vegetation With High Temperature and Floating Oxygen," which requires two furnace bodies, i.e., inner furnace body and outer furnace body, wherein the entrance of the furnace chamber is open, and when the carbonization process begins, the vegetation is fed to the inner furnace through the entrance of the furnace chamber and fired to rapidly decompose, with combustible gases of high temperature exhausted to rise and fully contact with the floating oxygen in the air to form flames, and then the entrance of the furnace chamber is closed, and the vegetation continues to feed to keep the carbonization process in force, until the carbonization process is finished and thus the temperature is quickly lowered to below the firing point. However, the above vegetation carbonization process has the following disadvantages. Because the flame of vegetation thrown into the inner furnace seals the entrance of the furnace chamber of the inner furnace and thus the air cannot enter the lower portion of the inner furnace, the vegetation subsequently fed cannot be easily and completely carbonized. After the carbonization process is finished, it is complicated to discharge the charcoal from the inner furnace, and auxiliary time for discharging, etc., is longer in comparison with the time for pyrolysis carbonization. And the labor intensity of workers is heavy, and discharge cannot be performed until all the vegetation thrown into the inner furnace is carbonized and the temperature is reduced for a long time. After a previous discharge, operations to fill, carbonize and discharge is once again taken, resulting in time consuming and lower production rate. Furthermore, since the equipment takes a form of stationary structure, the cost for transporting crop straws is extremely high, and thus requirements of high efficiency, low cost and production in large scale cannot be fulfilled.

It is described in the Chinese Patent No. ZL01132888.6, entitled "A Device for Carbonization of by-Products of Crop Straws, Etc." The device comprises a bottom opening provided in the bottom of a cylindrical container with a top cover, and a heat flux tube passing vertically through the bottom opening. An upper end of the heat flux tube terminates at a distance of 10 cm to the top of the cylindrical container, and the lower end thereof projects 3 cm downwards from the bottom of the cylindrical container to form a horizontal opening at the side of the cylindrical container. A gas tube communicating with the horizontal opening is provided on the cylindrical container and projects outwardly. A skirt-shaped base is provided at the lower end to support the whole cylindrical container, with a portion thereof opened as combustion opening. Heat insulation layers are provided at the sides and the top of the cylindrical container, and on the cover. After the fire is distinguished, carbonization products carbonized by the carbonization device is stored for 24 hours and then taken out after removing the cover. Thereafter, a next carbonization process is started. These limit the production rate of the carbonization of crop straws. Since the carbonization device takes a form of a stationary structure, the cost for transporting by-products of crop straws is extremely high, and the requirements of high efficiency, low cost and production in large scale cannot be fulfilled.

If a traditional kiln is used to carbonize crop straws, the production rate is high. However, the production cycle is quite long from several days up to tens of days, the efficiency and the safety are low, and the economical profit is not good. Solutions to problems of discharging the floating particles and poor environmental performance caused by the collection of wood tar and straw vinegar solution cannot be found, and thus it is not worth promoting.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of this invention is to solve the problems in prior art, such as low efficiency in pyrolysis carbonization, high cost for carbonization of crop straws and limited production scale. The present invention is to provide a method and a device for carbonization of crop straws so as to satisfy the requirements for pyrolysis carbonization of different crop straws.

In order to achieve the above object, the present invention provides a method of producing charcoal from crop straws, comprising a pyrolysis process and a carbonization process, wherein said pyrolysis process is controlled by regulating the feeding of oxygen during said pyrolysis process, and the pyrolysis process and the carbonization process are respectively conducted in separate pyrolysis and carbonization pools, in which pyrolysis pool the straws are pyrolyzed and entered into said carbonization pool to be carbonized.

In the method of producing charcoal from crop straws according to the present invention, the pyrolysis process and the carbonization process are separated by performing the pyrolysis and the carbonization processes in different units of the device, so that the production efficiency is improved. At the same time, the temperature of the crop straws in the pyrolysis pool is quickly raised by a controllable oxygen feeding method during the pyrolysis process, and then the crop straws are dried, preheated and quickly pyrolyzed.

In another aspect, the present invention further provides a method for producing charcoal from crop straws, comprising the following steps of: 1) feeding crop straws, either chopped or not chopped, into a pyrolysis pool; 2) initiating pyrolysis process when the crop straws are lighted; 3) feeding the pyrolyzed crop straws into a carbonization pool when the temperature in the pyrolysis pool reaches 200 to 850° C., wherein the time of carbonization process is from five minutes to thirty minutes depending on the different applications of the products.

In order to achieve the above object, the present invention further provides a combined device for carbonization of crop straws, comprising a pyrolysis pool, a carbonization pool and a controllable oxygen feeding pipe, wherein a regulating butterfly valve for the oxygen feeding pipe is provided at an oxygen feeding port of said controllable oxygen feeding pipe, and a branch oxygen supply port connected to said controllable oxygen feeding pipe is in communication with said pyrolysis pool. Said pyrolysis pool and said carbonization pool are two separate units of the device, wherein one or more furnace grates of turn plate type are provided within said pyrolysis pool, and said carbonization pool is arranged below a material discharging port of said pyrolysis pool and provided with a cover having a one-way ventilator.

The device of the present invention accomplishes the pyrolysis process and the carbonization process in the separate units, so that the pyrolysis carbonization efficiency is raised. In use, the crop straws are fed into the pyrolysis pool and fired due to the combustibility thereof, and the crop straws are dried, preheated and are in part pyrolyzed with the heat obtained from the combustion of crop straws. During the procedure, depending on the moisture content of the crop straws and types of the crop straws, the opening of the oxygen feeding pipe is controlled so as to quickly raise the temperature of the crop straws, effectively dry and preheat the crop straws, and a part of the pyrolysis degree is controlled so as to make sure the crop straws would not be over-pyrolyzed into ashes; then the furnace gratings are turned so as to drop the crop straws into the lower portion of the pyrolysis pool, and the crop straws are further pyrolyzed without oxygen below the branch oxygen feeding port. Combustible gases such as CO, $H_2$, $C_nH_m$ produced during the pyrolysis carbonization process enter into a space over the branch oxygen feeding port of the pyrolysis pool for secondary combustion so as to raise the temperature of the pyrolysis pool. After the pyrolysis process of the crop straws in the pyrolysis pool is finished, the crop straws are fed through a material discharging port into the carbonization pool, and the carbonization pool then is closed via the cover with a one-way ventilator in a gas tight manner to insulate oxygen. The carbonization time in the carbonization pool is determined, depending on the different applications of the crop straws carbon.

The present invention further comprises a gas collecting shell provided above said pyrolysis pool, wherein said gas collecting shell is in communication with a settlement room through a gas channel, and one stage or several stages of spacers are provided in said settlement room. A top end of said settlement room is in communication with said gas channel and is provided with a gas discharging port, and an oil-liquid collector is connected to the lower end of said gas discharging port, with an oil-liquid collecting container below said oil-liquid collector.

The spacer is connected to the wall of the settlement room at one end only. The upper end of a first stage of the spacer is connected to the top of the settlement room, and the second stage of the spacer is connected to the bottom of the settlement room, and so on. Gases from the pyrolysis carbonization process enter into one end of the settlement room through the gas collecting shell and the gas channel, then into another end from below the spacer, and finally discharged from the gas discharging port at the top of the settlement room. Through this path, the travel of the gases is increased with the speed and the temperature thereof reduced. Floating particles in the gases fall into the bottom of the settlement room. The oil liquid collector is provided below a gas discharging port at the end of the settlement room, via which the gases will be discharged into the air. After the gases entering into the settlement room naturally condense, wood tar and straw vinegar solution contained in the gases are adsorbed by the oil liquid collector.

In yet another aspect of the present invention, a charcoal product of crop straws produced either by the method according to the present invention or using the device according to the present invention is further provided, wherein the charcoal product is a fragile black mixture of powder and granules with a unit weight of less than 0.08 ton per cubic meter. The physicochemical characteristics of the products differ with the degree and time of heating during the pyrolysis process. As a result, the charcoal product comprises on a dry basis: 44-59 wt % of fixed carbon, 10-35 wt % of volatile matter, and 24-33 wt % of ash, and has a water absorption of 280-380 wt %.

In comparison with the prior art, the present invention has the following features: (1) during the pyrolysis process, according to the difference in moisture content of the crop straws and the types of the crop straws, the oxygen feeding is controlled so that the crop straws are high effectively dried, preheated and pyrolyzed; (2) the pyrolysis process and the carbonization process are separated and accomplished in different units, so that the pyrolysis carbonization efficiency is greatly improved; (3) the combined structure design allows the pyrolysis carbonization device to be easily transported to the straw production place and quickly assembled. A problem of the general crop straws pyrolysis carbonization device being too large to transport or move is solved; (4) It is easily disassembled for transferring. According to the distribution of the crop straws, the crop straws pyrolysis carbonization device is timely disassembled to transport to a suitable operation region so as to reduce the high cost of crop straws transportation. At the carbonizing site of crop straws, the units are quickly assembled through a base plate, a frame and fasteners. When the carbonization in an operation region is finished, the device is disassembled for transporting to another operation region, and then such device is reassembled at that place for carbonization; (5) A gas settlement room is used in the crop straws pyrolysis process. The floating particles in the gas flow fall to the bottom of the settlement room through means in the settlement room. Wood tar and straw vinegar solution naturally condenses to adhere to the oil liquid collector and flows to the oil liquid collecting container, with the exhausted gas discharged harmlessly into the atmosphere. It is assured that the production procedure is harmless to the environment.

The crop straws charcoal produced by the present invention has various applications, e.g., for processing solid fuels utilized by rural residences to replace the fossil fuel; for modifying the soil by increasing the moisture content, the air permeability and the content of organic materials, so that the crop production is raised and diseases due to pests are decreased; for pre-processing the crop straws as raw materials of the methane production, resulting in the reduction of the volume of the crop straws and easy transportation and storage, and thus more economical and safe production of methane.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
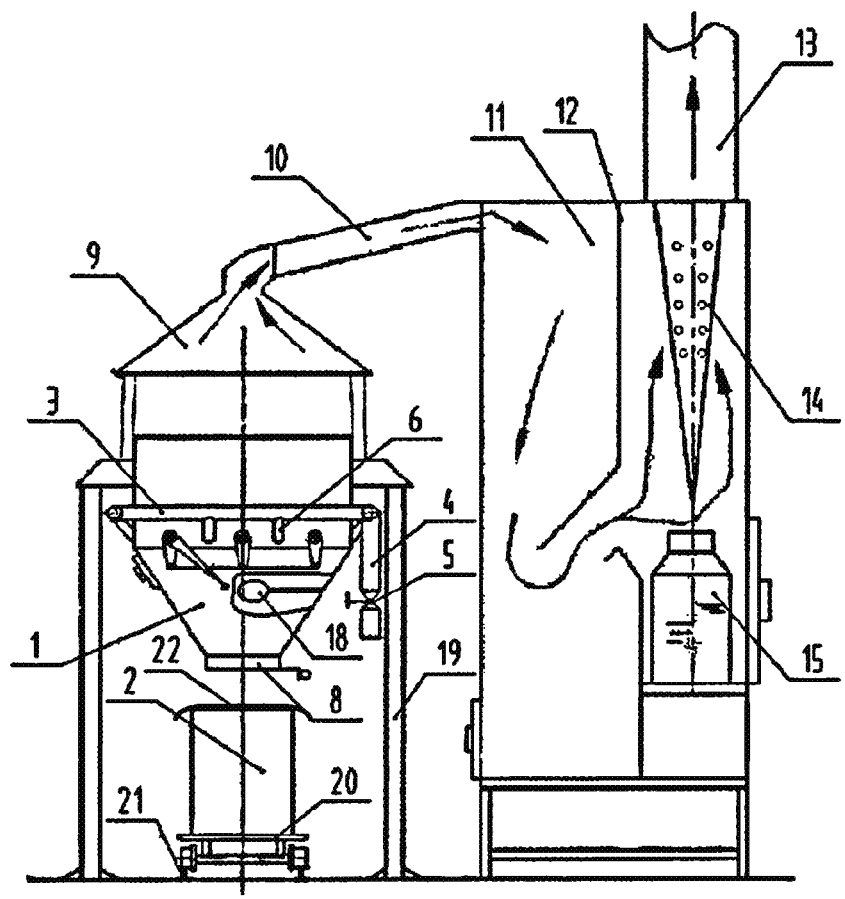
FIG. 1 illustratively shows the structure of this invention.
Figure 2:
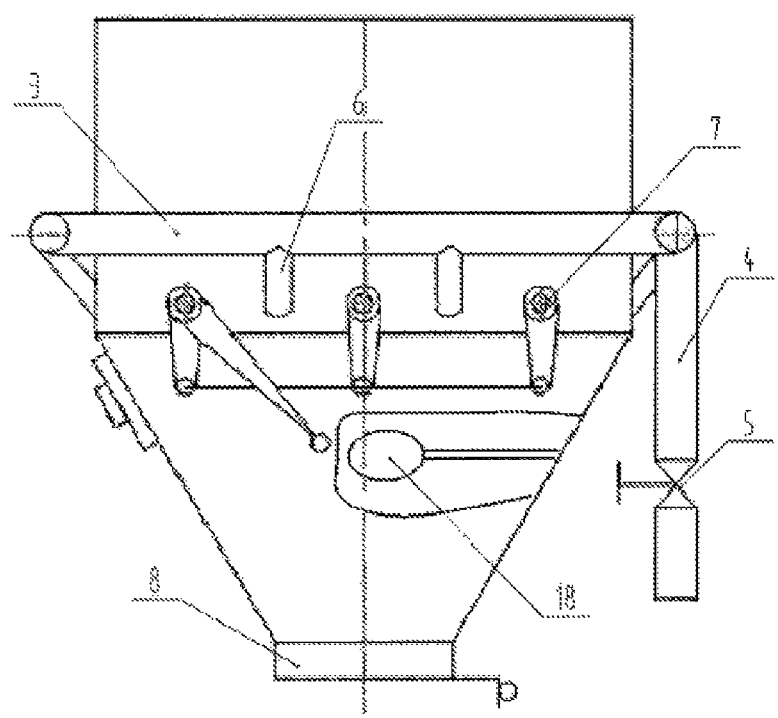
FIG. 2 illustratively shows the structure of the pyrolysis pool.
Figure 3:
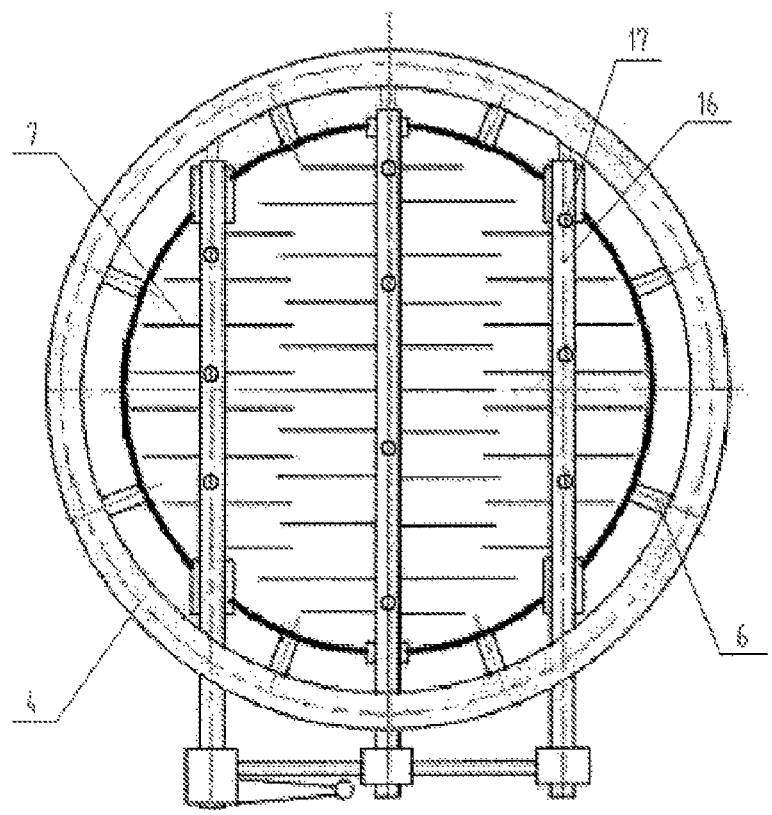
FIG. 3 is a top view of FIG. 2.

The reference numbers in the figures represent respectively: 1—pyrolysis pool, 2—carbonization pool, 3—oxygen feeding pipe, 4—oxygen feeding port, 5—butterfly valve, 6—branch oxygen feeding port, 7—furnace grates, 8—discharging port of the pyrolysis pool, 9—gas collecting shell, 10—gas channel, 11—settlement room, 12—spacers, 13—gas discharging port, 14—oil-liquid collector, 15—oil-liquid collecting container, 16—hollow shaft, 17—hollow shaft branch oxygen feeding ports, 18—ignition device, 19—support frame, 20—liftable support plate, 21—rail, and 22—cover having a one-way ventilator.

DETAILED DESCRIPTION

While illustrative embodiments have been illustrated and described, it will be appreciated that various changes can be made therein without departing from the spirit and scope of the invention.

This invention is further described with reference to the Figures.

The present invention provides a combined crop straw carbonization method, in which a pyrolysis process is controlled by regulating the feeding of oxygen during the pyrolysis process, and pyrolysis and carbonization are respectively conducted in separate pyrolysis pool 1 and carbonization pool 2, wherein the straws are pyrolyzed in the said pyrolysis pool 1 and the pyrolyzed straws are discharged into the said carbonization pool 2 for carbonization.

Corresponding to the above method, the present invention provides a crop straw carbonization device, comprising a pyrolysis pool 1, a carbonization pool 2 and a regulated oxygen feeding pipe 3, wherein a butterfly valve 5 for the oxygen feeding pipe is provided at an oxygen feeding port 4 of said regulated oxygen feeding pipe 3, and branch oxygen supply ports 6 connected to the regulated oxygen feeding pipe 3 are in communication with the pyrolysis pool 1. The pyrolysis pool 1 and the carbonization pool 2 are two separate units of the device, wherein one or more furnace grates 7 of turn plate type are provided within the pyrolysis pool 1, and the carbonization pool 2 is provided below a discharging port 8 of the pyrolysis pool 1 and provided with a cover 22 having a one-way ventilator.

The pyrolysis pool 1 is mounted on a support frame 19, and the carbonization pool 2 is located on a liftable support plate 20 which is below the pyrolysis pool 1 and is placed on a rail 21. Furnace grates 7 are fixed to the wall of the pyrolysis pool 1 through a shaft, and the butterfly valve 5 controls the opening and closing of the oxygen feeding port 4. The regulated oxygen feeding pipe 3 is arranged below the furnace grates 7 of the pyrolysis pool 1 along the outer wall of the pyrolysis pool 1 and is in communication with the outer wall of the pyrolysis pool 1. The cover 22 (on the carbonization pool 2) with a one-way ventilator is lifted to release gases when the pressure becomes high. It is possible that one pyrolysis pool 1 corresponds to one or more carbonization pools 2. The carbonization pool 2 not only has a carbonization function, but also can be used for a special carbonization product, assuring that the pyrolysis process is continuous. The branch oxygen supply ports 6 are distributed along the regulated oxygen feeding pipe 3 and are in communication with the inside of the pyrolysis pool 1. The hot gas rises due to the combustion of straws in the pyrolysis pool 1, and a pressure difference is present between the external portion and the internal portion of the pyrolysis pool 1. Now, if the butterfly valve 5 communicating with the external portion of the pyrolysis pool 1 is activated, the air outside the pyrolysis pool 1 will, due to the negative pressure, enter into the pyrolysis pool 1 via the regulated oxygen feeding pipe 3 so as to assist the combustion. During the initial firing period after the straws are entered into the pyrolysis pool 1, the oxygen feeding port 4 is fully opened so as to rapidly raise the temperature in the pyrolysis pool 1, and therefore, the straws are rapidly dried and preheated. When the temperature reaches 200-850° C., the opening of the oxygen feeding port 4 is gradually decreased to reduce the oxygen into the pyrolysis pool 1, so that it avoids the straws being over-pyrolyzed into ashes due to the overfeed of oxygen.

The present invention further comprises a gas collecting shell 9 which is located above the pyrolysis pool 1 by a support frame 19, wherein the gas collector 9 is in communication with a settlement room 11 through a gas channel 10, and a stage or several stages of spacers 12 are provided in the settlement room 11. A top end of said settlement room 11 is in communication with the gas channel 10 and is provided with a gas discharging port 13. An oil-liquid collector 14 is connected to the lower end of the gas discharging port 13, with an oil-liquid collecting container 15 below the oil-liquid collector 14. The oil-liquid collecting container 15 has a cone shape and through holes distributed along its surface. The spacer 12 is connected to the wall of the settlement room 11 at one end and is spaced apart from the wall of the settlement room 11 at another end. For example, the upper end of a first stage of the spacer is connected to the top of the settlement room 11, and the second stage of the spacer is connected to the bottom of the settlement room, and so on, wherein a gas channel is formed in the settlement room 11.

The branch oxygen supply ports 6 are arranged to correspond to one or more of the furnace grates 7 of turn plate type, and the furnace grates 7 are controlled in steps. The position of the branch oxygen supply ports 6 is below or aligned with the plane in which the corresponding furnace grates 7 is located, so that straws on each step of the furnace grates 7 fully obtain oxygen.

In order to further improve the effect of oxygen utilization on the basis of the existing structure, the furnace grates 7 of turn plate type are fixed to a hollow shaft 16 which is in communication with the oxygen feeding pipe 3 and on which branch oxygen feeding ports 17 are provided, so that the hollow shaft on the furnace grates become an oxygen feeding portion.

An ignition device 18 is provided below the furnace grates 7 of turn plate type and has a structure of platform or plate fixed to the wall of the pyrolysis pool 1. During the pyrolysis process, a few of the fired straws will fall onto the ignition device 18, so that the straws consequently fed into the pyrolysis pool 1 will be rapidly ignited.

The present invention comprises primary components, such as the pyrolysis pool 1, the carbonization pool 2, the gas collecting shell 9, the settlement room 11, and secondary components. In use, the dry and combustible crop straws are fed into the furnace grates 7 of the pyrolysis pool 1 and are fired. When the hot gas rises due to the combustion of crop straws, a negative pressure is created, and enough oxygen is automatically fed through the oxygen feeding pipe 3 into the pyrolysis pool 1, so that the temperature in the pyrolysis pool 1 is rapidly raised, and thus the crop straws are quickly dried and pre-heated, with a portion of the crop straws pyrolyzed. During the initial pyrolysis period of the crop straws using their own heat, according to the types of the crop straws and their moisture content, the opening of the butterfly valve 5 at the oxygen feeding port 4 is adjusted accordingly. When it is assured that the temperature can be quickly raised by high effectively utilizing heat of the crop straws, overfeed of the oxygen shall be avoided so as to prevent the crop straws from being over-pyrolyzed into ashes. After the crop straws are quickly dried and pre-heated in the pyrolysis pool 1 with a portion thereof pyrolyzed, the furnace grates 7 are turned, and thus all the crop straws on the furnace grates 7 fall into the lower portion of the pyrolysis pool 1. During this procedure, a few of the ignited crop straws fall into the ignition device 18, so that the crop straws subsequently fed into the pyrolysis pool 1 will be rapidly fired. Most of the crop straws that have fallen into the lower portion of the pyrolysis pool 1 continue to, under a state of high temperature and oxygen insulation, rise to a pyrolysis temperature. This process avoids some fiber components of the crop straws being combusted to ashes in the state of high temperature due to overfeed of oxygen. During the severe pyrolysis carbonization process, the primary components of the crop straws such as all the celluloses, hemicellulose and part of lignin are pyrolyzed and carbonized. After a temperature rise in the pyrolysis process, the crop straws enter into the carbonization pool 2 through the discharging port 8 of the pyrolysis pool, and immediately the cover 22 having a one-way ventilator is closed so as to hermetically insulate the carbonization pool 2 from oxygen, and the carbonization is continued under the crop straws' heat. The carbonization time of the carbonization pool 2 is determined depending on the final application of the crop straws carbon. The gas produced in the pyrolysis process enters into the settlement room 11 through the gas collecting shell 9 and the gas channel. The spacer 12 is longitudinally in a direction of gas flow arranged in the settlement room 1 to separate the settlement room 1, so that the speed of the gas is effectively decreased, and the gas temperature is reduced, resulting in the floating particles falling to the bottom of the settlement room 1 and collectively treated. Wood tar and straw vinegar solution present in the gas during the pyrolysis carbonization process of crop straws will naturally condense to adhere to the oil liquid collector 14, flow to the oil liquid container 15, and is centrally collected to be treated, wherein the exhaust gas is harmlessly discharged to the atmosphere through the gas discharging port 13.

The embodiments of the invention in which an exclusive property or privilege is claimed are defined as follows:

1. A device for carbonization of crop straws, comprising a pyrolysis pool (1), a carbonization pool (2) and a regulated oxygen feeding pipe (3), wherein a butterfly valve (5) for the oxygen feeding pipe is provided at an oxygen feeding port (4) of said regulated oxygen feeding pipe (3), said regulated oxygen feeding pipe (3) is in communication with said pyrolysis pool (1) through branch oxygen supply ports (6) connected thereto, and said pyrolysis pool (1) and carbonization pool (2) are two separate units of the device, and wherein one or more furnace grates (7) of turn plate type are provided within said pyrolysis pool (1), said furnace grates (7) being connected to a shaft or several shafts and configured such that material resting on said furnace grates (7) falls into a lower portion of said pyrolysis pool (1) when said furnace grates (7) are turned, and wherein said carbonization pool (2) is located below a material discharging port (8) of said pyrolysis pool (1) and is provided with a cover (22) having a one-way ventilator.

2. The device for carbonization of crop straws according to claim 1, further comprising a gas collecting shell (9) provided above said pyrolysis pool (1), wherein said gas collecting shell (9) is in communication with a settlement room (11) through a gas channel (10), and a stage or several stages of spacers (12) are provided in said settlement room (11), a top end of said settlement room (11) is in communication with said gas channel (10) and is provided with a gas discharging port (13), and wherein an oil-liquid collector (14) is connected to the lower end of said gas discharging port (13), with an oil-liquid collecting container (15) below said oil-liquid collector (14).

3. The device for carbonization of crop straws according to claim 1, wherein said branch oxygen supply ports (6) are arranged to correspond to one or more of said furnace grates (7) of turn plate type, and said furnace grates (7) are controlled in steps, and wherein the position of said branch oxygen supply port (6) is below or aligned with the plane in which said corresponding furnace grates (7) is located.

4. The device for carbonization of crop straws according to claim 1, wherein said furnace grates (7) of turn plate type are fixed to hollow shafts (16) in communication with said oxygen feeding pipe (3) and provided with branch oxygen feeding ports (17).

5. The device for carbonization of crop straws according to claim 3, wherein said furnace grates (7) of turn plate type are fixed to hollow shafts (16) in communication with said oxygen feeding pipe (3) and provided with branch oxygen feeding ports (17).

6. The device for carbonization of crop straws according to claim 1, wherein an ignition device (18) is provided below said furnace grates (7) of turn plate type.

7. The device for carbonization of crop straws according to claim 4, wherein an ignition device (18) is provided below said furnace grates (7) of turn plate type.

8. The device for carbonization of crop straws according to claim 2, wherein said branch oxygen supply ports (6) are arranged to correspond to one or more of said furnace grates (7) of turn plate type, and said furnace grates (7) are controlled in steps, and wherein the position of said branch oxygen supply port (6) is below or aligned with the plane in which said corresponding furnace grates (7) is located.

9. The device for carbonization of crop straws according to claim 2, wherein said furnace grates (7) of turn plate type are fixed to hollow shafts (16) in communication with said oxygen feeding pipe (3) and provided with branch oxygen feeding ports (17).

10. The device for carbonization of crop straws according to claim 8, wherein said furnace grates (7) of turn plate type are fixed to hollow shafts (16) in communication with said oxygen feeding pipe (3) and provided with branch oxygen feeding ports (17).

11. The device for carbonization of crop straws according to claim 2, wherein an ignition device (18) is provided below said furnace grates (7) of turn plate type.

12. The device for carbonization of crop straws according to claim 5, wherein an ignition device (18) is provided below said furnace grates (7) of turn plate type.

13. The device for carbonization of crop straws according to claim 10, wherein an ignition device (18) is provided below said furnace grates (7) of turn plate type.

* * * * *